Patented Feb. 5, 1952

2,584,105

UNITED STATES PATENT OFFICE 2,584,105

INSECT REPELLENTS

Paul D. Bartlett, Weston, Mass., and Blaine C. McKusick, Wilmington, Del., assignors to the United States of America as represented by the Secretary of the Army No Drawing. Application January 7, 1949, Serial No. 69,837

6 Claims. (Cl. 167—30)

This invention relates to insect repellents.

We have discovered that the application of a dialkyl ester of hexahydrophthalic acid, having the structural formula

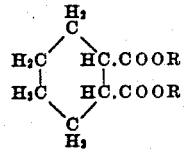

wherein R is an alkyl radical preferably having not more than 2 carbon atoms, when applied to the human skin or a fabric, effectively repels insects, particularly Aedes aegypti and Anopheles quadrimaculatus.

Tests to measure the repellency of the above-mentioned compounds against insects by skin application were conducted by smearing the compound on the arms of test personnel, who then thrust their arms into cages containing insects. The arms were exposed for 30-minute intervals at 3 minutes each until the first insect bite.

Tests to measure the repellency of fabrics impregnated with the above-mentioned compounds against insects were conducted by uniformly impregnating mercerized cotton hose with the compound at a rate equivalent to 3.3 gms. per sq. ft., drawing the dried hose over the arms of test personnel, who then thrust their covered arms into cages containing insects for 1 to 2 minutes.

Examples of dialkylesters of hexahydrophthalic acid having insect-repellent properties are, for instance, dimethyl-hexahydrophthalate, diethyl-hexahydrophthalate (cis and trans), di-n-propyl-hexahydrophthalate, di-i-propyl-hexahydrophthalate, di-i-amyl-hexahydrophthalate.

The following table illustrates the results obtained by the above test methods against Aedes aegypti and Anopheles quadrimaculatus, as examples of insects against which the invention is applicable, by using compounds in accordance with the present invention.

| Material | Insect Repellency upon Application to Skin | | Insect Repellency of Impregnated Fabric against Aedes aegypti |
|---|---|---|---|
| | Aedes aegypti | Anopheles quadrimaculatus | |
| | Mins. | Mins. | |
| Hexahydrophthalic acid, dimethyl ester | 256 | 66 | over 10 days. |
| Hexahydrophthalic acid, diethyl ester (cis) | 194 | 55 | over 10 days. |
| Hexahydrophthalic acid, diethyl ester (trans) | 206 | 57 | at least 1 day. |
| Hexahydrophthalic acid, di-n-propyl ester | over 60 | (1) | |
| Hexahydrophthalic acid, di-i-propyl ester | over 60 | (1) | over 10 days. |
| Hexahydrophthalic acid, di-i-amyl ester | over 60 | (1) | |

[1] Not determined.

It will be seen from the foregoing table that the dimethyl and diethyl esters of hexahydrophthalic acid possess superior insect repellent properties, while the insect repellent properties of the corresponding propyl and higher esters are not particularly striking.

For ease of application, the hexaphydrophthalic acid esters contemplated by the present invention may be incorporated in a suitable inert liquid or solid carrier such as mineral oil, alcohol, petrolatum, etc. For facile and uniform fabric impregnation, they may be applied in an inert solvent, such as alcohol, ether, etc.

Having thus fully described our invention, we claim:

1. An insect-repellent fabric comprising fabric impregnated with dimethyl-hexaphydrophthalate.

2. An insect-repellent composition comprising dimethyl-hexahydrophthalate in an inert non-gaseous organic carrier.

3. An insect repellent composition comprising dimethyl-hexahydrophthalate in alcohol.

4. An insect repellent composition comprising dimethyl-hexahydrophthalate in ether.

5. An insect repellent composition comprising dimethyl-hexahydrophthalate in oil.

6. An insect repellent composition comprising dimethyl-hexahydrophthalate in petrolatum.

PAUL D. BARTLETT.
BLAINE C. McKUSICK.

REFERENCES CITED

The following references are of record in the file of this patent:

UNITED STATES PATENTS

| Number | Name | Date |
|---|---|---|
| 2,400,006 | Jones et al. | May 7, 1946 |

OTHER REFERENCES

O. S. R. D.: Committee on Medical Research, August 31, 1945, page 17, Progress Report No. 25, section 1. (Copy available in Div. 43).

Linduska et al.: "Flea Repellents for Use on Clothing." Journal of Economic Entomology, December 1946, pp. 767–769.